Figure 1:
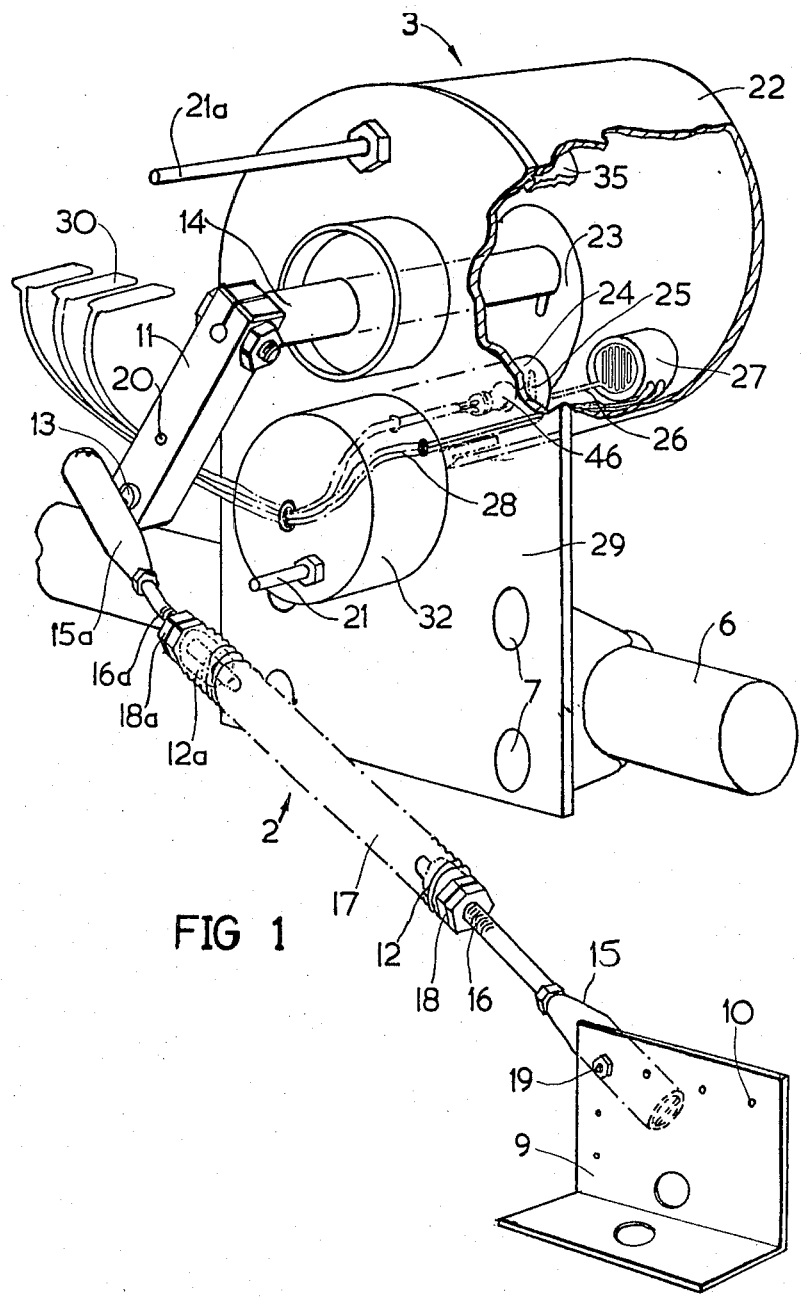

United States Patent [19]
Askew

[11] 3,867,990
[45] Feb. 25, 1975

[54] WEIGHING APPARATUS FOR TRUCK AND VEHICLE LOADS

[76] Inventor: Malcolm Anthony Askew, 64 Moonshine Rd., Upper Hutt, New Zealand

[22] Filed: May 23, 1974

[21] Appl. No.: 472,769

[30] Foreign Application Priority Data
June 1, 1973 New Zealand .................. 170913

[52] U.S. Cl. .................. 177/137, 177/DIG. 6
[51] Int. Cl. .................. G01g 19/08
[58] Field of Search .................. 177/136, 137, DIG. 6

[56] References Cited
UNITED STATES PATENTS
3,409,097 11/1968 Gregory, Jr. .................. 177/136 X
3,661,221 5/1972 Barrett .................. 177/136

FOREIGN PATENTS OR APPLICATIONS
1,549,227 12/1970 Germany .................. 177/136

Primary Examiner—George H. Miller, Jr.
Attorney, Agent, or Firm—Ladas, Parry, Von Gehr, Goldsmith & Deschamps

[57] ABSTRACT

An apparatus for providing an indication of the weight of a load on a vehicle or on any part of the vehicle comprising a sensing means operable between a moving part and a stationary part of the vehicle and sensing the distance between the stationary part and the moving part, a transducer unit converting any alteration of the said distance detected by the sensing means into a proportional electric property and an electrical gauge receiving the output from said transducer unit characterised in that the transducer unit includes a spindle associated with a light beam, a shutter for the light beam and a photoelectric cell receiving the light beam the arrangement being such that alteration of the said distance detected by the sensing means is followed by proportional rotation of the spindle which causes the light beam to be proportionately modified by the shutter in a manner which is detectable by the photoelectric cell and converted into a proportional electric property.

12 Claims, 4 Drawing Figures

WEIGHING APPARATUS FOR TRUCK AND VEHICLE LOADS

This invention relates to an apparatus to provide an indication of the weight of a load on a vehicle particularly on an automotive truck.

In view of government regulations which require that the maximum load on each different type of truck should not or may not exceed, the necessity for a device which gives an indication when the load has reached the maximum legal limit, and beyond, has become necessary.

When a load is placed on a vehicle such as an automotive truck the tray and chassis of the truck depresses relative to the axle which remains stationary relative to the clearance above the ground surface on which vehicle is standing. The vertical distance between a point on the chassis and a point on the axle of the truck will thus decrease as the truck is more heavily loaded. It has been found that with a vehicle having a suitable suspension system such as steel springs this alteration in distance is proportional to the load and that such correspondence with the applied load is substantially consistent over an extended period of time.

In this specification those parts of a vehicle which, when a load is applied to the tray of the vehicle, move in relation to the axles of the vehicle, are termed "moving parts," while those parts of the vehicle which remain stationary in relation to the axles are termed "stationary parts."

By this invention there is provided a device which can act between a moving part and a stationary part of a vehicle in order to determine the change in distance between these two parts and convert such alterations in distance to a measurable property.

In accordance with the invention the device comprises a sensor arm, rotating on a spindle, the spindle being associated with a beam of light and a shutter for the light beam, the device further including a photoelectric cell receiving the light beam, and the arrangement being such that on rotation of the spindle the light beam is modified in a manner which can be detected by the photoelectric cell and converted to a measureable proportional electric property.

In a further or alternative aspect of this invention there is provided a device for use in indicating the load on a vehicle comprising a sensor arm having rigid end portions joined in a turnbuckle effect by an expansion spring, the sensor arm adapted to co-operate with a transducer unit which converts movements of the sensor arm into a measureable property.

The invention therefore consists in two alternative features which when combined form a preferred feature of the invention. The device of the invention is intended to be mounted in any convenient place with desirably a device being associated with each axle of the vehicle, to provide an indication of the loading on each axle. The unit, on the rear axle, can operate between the underside of the tray of the vehicle and preferably the central part of the differential housing.

Figure 2:
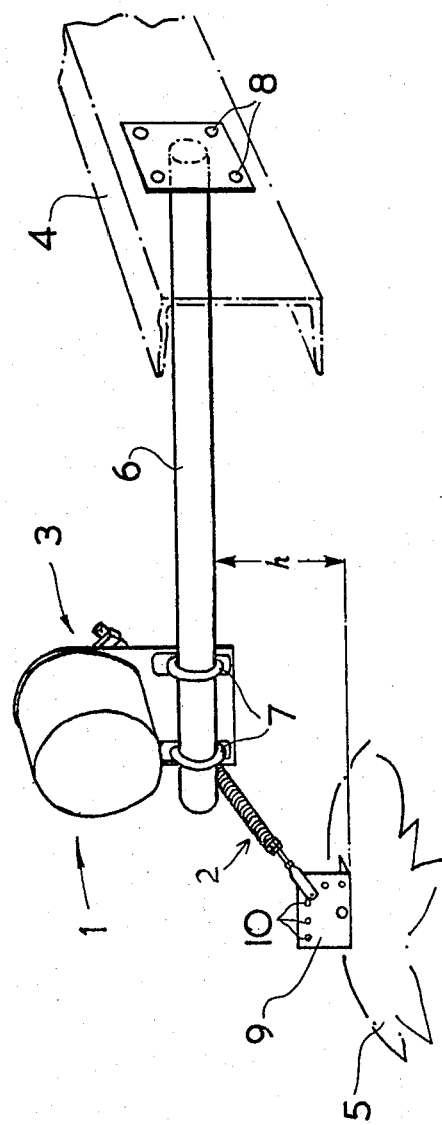

The device will now be described by way of example by reference to the accompanying sketches where FIG. 1 shows the device in schematic form with one part cut away for clarity while FIG. 2 shows the intended mounting manner of the device.

Referring to FIG. 2 the device indicated by arrow 1 has a sensor arm indicated by arrow 2 and a transducer unit indicated by arrow 3. The device 1 is mounted between the inside or near to the channel 4 and the differential housing 5 by means of suitable linkages or mounting members. Desirably the system of mounting the device is adjustable to accommodate the different dimensions in for example, different vehicles or between different axles or to accommodate the changes that may take place over long periods of time in the vehicle springs. For example, a mounting member 6 is provided on which transducer unit 3 is adjustably mounted by means of U-bolts 7, frictionally engaging about the member 6. Mounting member 6 is secured to the channel 4 in a rigid manner such as by bolts 8, through the channel 4.

Sensor arm 2 can rest on part of the differential housing but more preferably it is pivotally attached so its position on the differential housing is constantly fixed. One method of effecting this is to provide a second mounting bracket 9 rigidly fixed to the differential housing 5, and having alternative attachment points 10 for pivotal attachment of the end of the sensor arm 2.

The sensor arm 2 is required to yield consistently accurate indication of the alteration of the height h as shown in FIG. 2. In use, the sensor arm will be subject to various stresses when the truck or other vehicle is subject to a sudden bump. The sensor arm 2 needs to be able to absorb stresses and the preferred manner of effecting such a result is shown in FIG. 1 of the drawings. The sensor arm 2 is mounted in a toggle arrangement having a toggle arm 11 pivotally connected at mounting 13. The toggle arm 11 of the sensor unit is attached to a spindle 14 which is rotatably mounted on the transducer unit 3. The connection between toggle arm 11 and spindle 14 is preferably adjustable such as by the toggle arm 11 having a split end and having a bolt and nut arrangement clamping the split end onto a spline on the end of the spindle; so that the point of attachment of spindle 14 to toggle arm 11 is variable along the length of the spindle 14 and so that any suitable angle of inclination from the horizontal position can be chosen for the normal position of the toggle arm 11.

The sensor arm 2 consists of two lengths of rigid material 15, 15a each having a screw thread at 16, and at 16a one being a reverse thread to the other so that a turnbuckle effect is achieved with a spring 17, preferably an expansion spring, being adjustable on the screw threads 16 and 16a. Securing nuts 18 and 18a are provided to lock the spring 17 in the desired position. Spring guides 12 and 12a are also preferably provided to maintain alignment of the spring. By rotation of the spring assembly 17 the turnbuckle effect is achieved which alters the length of the sensor arm 2 which consequently modifies the angle at which toggle arm 11 is to the horizontal position when the device is mounted on the vehicle in the manner shown in FIG. 2. Such adjustment can be of a fine nature while adjustment of toggle arm 11 on spindle 14 as mentioned above can be of a coarser nature. In addition the attachment point of the sensor arm 2 to the toggle arm 11 can be adjustable along the length of the toggle arm 11 e.g. by providing further adjustment points 20.

Spring 17 is, under tension, expandable to absorb any sudden stresses in such direction while under compression of a large enough force, the spring buckles in a resilient manner. The spring will need to retain its length and form for an extended period of time in order that the sensor arm retains a constant length and straight alignment over such period. Most preferably the spring is an expansion spring but other resilient means are considered to be possible and within the scope of the invention. A desirable spring is a number 15 gauge spring made of a suitable alloy, such as steel, silicon/manganese or chromium/nickle. The sensor arm 2 is pivotally mounted at point 13 and also at point 19 so that the sensor arm 2 can freely rotate in a vertical plane about point 19. The mountings at 13 and 19 are preferably also of an elbow joint type so that there is some possible movement of the sensor arm in a different plane to allow for sudden relative movement of for example the chassis of the truck in relation to the differential housing in this direction.

Figure 3:
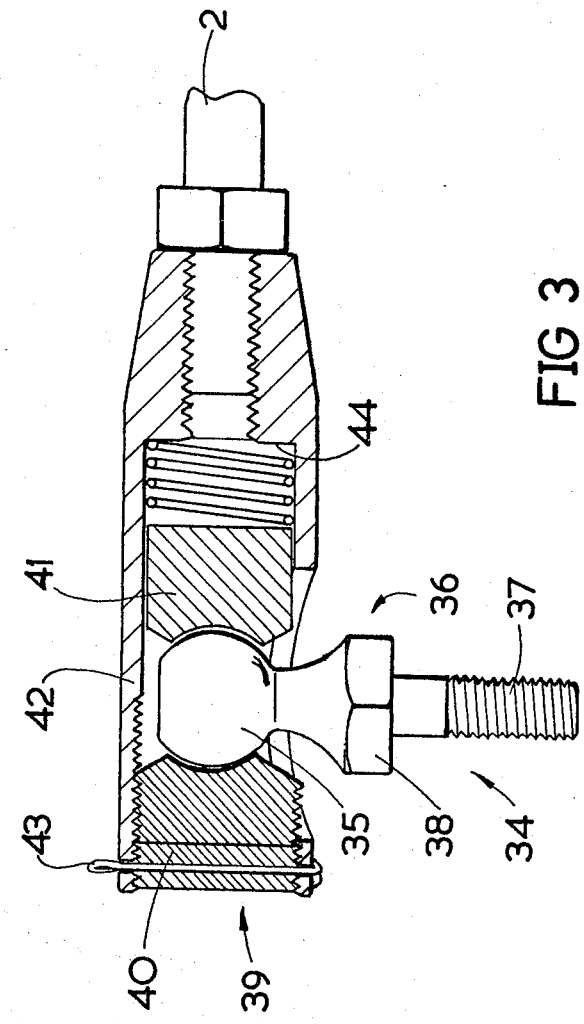

In one form such joint can be a ball and socket joint e.g. as shown in FIG. 3 of the drawings where the ball part indicated by arrow 34 has at one end a ball 35 of suitably hard material integrally formed with an attachment means indicated by an arrow 36 at the other end. The attachment means secures the ball part 34 to e.g. the toggle arm 11. Such attachment means can comprise a screw threaded bolt 37, which is received in a screw threaded recess in the toggle arm 11, bearing a flange 38 having a nut profile enabling a suitable spanner to be used to firmly engage the screw threaded bolt 37 in the recess in the toggle arm 11. Socket part indicated by arrow 39 can be formed integrally with the rigid material part 15a of sensor arm 2 or can be formed separately and attached to said rigid part 15a e.g. by a cooperating screw threaded bolt and recess arrangement, (not shown). Socket part 39 has two concave seating portions 40 and 41, first seating portion 40 being a set screw, screwing into the housing 42 of the socket part and being locked in position by a split pin 43 passing through housing 42 and through a diametrical slot (not shown) in the head of screw, and second seating portion 41 is freely mounted in said housing and is biased against the ball by a biasing means such as a spring seating against an internal wall 44.

To prevent the toggle arm 11 rotating through more than a desired angle, e.g. a half circle, buffers 21 and 21a are provided to stop the rotation of the toggle arm 11. In order to assist the spring 17 to buckle under compression e.g. under shock when toggle arm 11 hits buffer 21a, the rigid end portion 15a is curved towards the spindle 14 so that the direction of the force on the sensor arm 2 is away from the longitudinal axis of said sensor arm 2.

Referring once again to FIG. 2, as a load is placed on the tray of the truck, tray channel piece 4 depresses carrying with it transducer means 3 which urges toggle arm 11 and spindle 14 (in FIG. 1) to rotate. As spindle 14 rotates, it co-operates with a light beam and shutter member to modify the beam of light which modification is detected by a photoelectric cell and the output of the photoelectric cell circuit is fed to a meter which is calibrated to provide an indication of the weight of the load on the axle in proportion to the maximum permitted load on the vehicle or axle. The shutter member can be mounted on the spindle 14 to move in front of the light beam to an extent dependent on the degree of rotation of the spindle 14. Alternatively it is envisaged that the light beam can move with the rotation of the spindle while the shutter remains stationary to produce a degree of change in the light beam falling on the photoelectric cell.

The particular construction shown in FIG. 1 has been found to be an efficient means of practicing the invention. Thus in FIG. 1 spindle 14 is mounted in a rotatable manner such as on bearings through the wall of a substantially cylindrical enclosed chamber 22 and bears on its end, within the chamber 22, a shutter member 23. The bearings through the wall will need to be long lasting such as a high speed type e.g. prelubricated sealed bearings. The shutter member 23 is preferably an eccentrically mounted circular plate.

Also sealed through the wall of the chamber 22 but rigidly so, is a smaller chamber which is also generally cylindrical but other shapes can be used and which contains a light source 46. Small chamber 24 has a narrow aperture 25 through its internal plane face. The light source, through the aperture 25, creates a beam of light which is indicated by dotted lines 26 within the larger chamber 22, the beam 26 falling on the photoelectric cell indicated schematically as 27.

The eccentrically mounted circular plate acting as shutter 23 as it rotates conceals a differing proportion of the aperture 25 from the photoelectric cell 27 and hence the quantity of incident light falling on the active surface area of the photoelectric cell is modified by the rotation of the shutter 23. By a suitable positioning of the eccentric axis of the circular shutter 23 e.g. by provision of adjustment on the plate, or by adjustment of the normal (i.e. unloaded) position of the sensor arm 2, the active surface of the photoelectric cell 27 can be completely concealed from the light beam at a position where there is no load on the axle of the vehicle and the active surface of the photoelectric cell can be nearly completely exposed to light beam where the load is at the legal maximum. As the load on the tray of the truck is increased, the quantity of incident light on the active surface area of the photoelectric cell will also increase and as a result the electrical property of the photoelectric cell, which is dependent upon the quantity of incident light will proportionately change. The output of the photoelectric cell circuit is fed to a suitable meter which is calibrated to register, or at least provide an indication of, the relative weight on the axle of the vehicle in relation to the maximum legal load.

Alternative arrangements of the shutter are possible such as the plate 23 fully concealing the light beam and having a slot cut through its surface of such a type that as the plate rotates an increasing amount of light can shine through the slot.

The photoelectric cell can be any suitable light sensitive means; a light dependent resistor having been found a convenient and effective system. The connections to and from the photoelectric cell 27 can be taken through wires 28 sealed through the front wall of the first chamber 22 to the front surface of the mounting plate 29 for the transducer unit 3. Wires 28 can terminate at crimping connections 30 from which terminals the meter system can be taken. Alternatively (not shown) the wires 28 can pass from cell 27 through the rear wall of the first chamber 22 and then be turned back to pass through plate 29 to the front of plate 29.

The light source for the light beam in the small chamber 24 e.g. a light bulb 46 is plugged in through a suitably formed aperture (not shown) through the wall of the mounting plate 29 in alignment with the small chamber 24. The power supply for the light source is fed through a suitable lead passing to crimp connectors as discussed above. Preferably a cover 32 is provided to protect the bulb against extraneous matter such as dust, stones, grease. Such cover is removably attached and can consist of a right cylinder secured to the plate by means of the buffer 21 extending through its plane wall and through to the rear of the mounting plate 29 with the cover being clamped against the mounting plate 29 by a nut 33 screwing on the shaft of the buffer 21 and a further nut (not shown) also screwing on to the shaft against the rear surface of the mounting plate 29. Where the cover meets the front surface of the mounting plate sealing means can be provided e.g. a suitable resin or tape to prevent light entry.

Furthermore in order to prevent leakage of light into chamber 22 the mounting plate carries integrally a circular flange 35 about which the chamber 22 fits in a neat fit about the flange to seat against the rear surface of mounting plate 29 with sealing tape or resin (not shown) being placed around the join.

The light source must be of a constant intensity for an extended period of time in order to avoid extraneous readings from the output of the photoelectric cell. So that not only must the light source have an extended life but also the supply to the light source will need to be of a substantially constant potential. To maintain an extended life for the light source, a suitable bulb having a certain recommended operating voltage can be run at a voltage reduced below the recommended figure. To achieve such a reduced voltage and at a constant value the voltage supplied to the bulb can be controlled by a suitable voltage control means such as a Zener diode or more preferably an integrated circuit for length of life and stability. For example, operating from a 12 volt battery a suitable light source can be a 6 volt bulb where the voltage supply to the bulb is controlled at the 5.5 volt level by a suitable integrated circuit. Furthermore it is important that the potential across the photoelectric cell be constant and such potential can also be controlled by a voltage control means such as an integrated circuit.

The terminal box 30 can receive the desired connections from the power source which generally will be the vehicle's battery. In most instances the vehicle's battery is of 24 volts but in order that the apparatus can have universal employment suitable means can be incorporated into the circuit so that 12 volts is supplied to the voltage control means whether the power source is 24 volts or 12 volts, e.g. by use of separate terminals, where the terminal for a 24 volt battery further includes a voltage reducing means e.g. a suitable resistor.

The output from the photoelectric cell circuit can be detected by any suitable means which can incorporate amplification and control of the output.

There can be provision for selection of any number of different sensor devices for example, a device placed on each axle of a vehicle and a multi-position selector switch system can be provided for this purpose. Each sensing device being associated with a different position on the switch and each sensing device having a separate zeroing system where each device can be calibrated so that the meter registers an accurate indication of the relative load on the particular axle. A satisfactory zeroing system has been found to be the provision of a potentiometer situated in series with each transducer and the meter, where the potentiometer incorporates a manual adjustment means. As the potentiometer will be required to be adjusted several times, it is required to be of rugged character without at the same time forsaking quality and accuracy. The potentiometers can be located adjacent the meter in the cab of the vehicle being enclosed in a suitable protective container with provision being made for adjustment of the potentiometer from outside the container e.g. by provision of screw-adjustment on each potentiometer aligned with holes in the container through which a screwdriver can be inserted to turn the screw adjustment.

When the sensing device of the invention is fixed near and linked to the required axle and the console containing the meter and circuit components fixed to the cab, a measured load is placed to bear on the appropriate axle, with such measured load being at the maximum legal load permitted for that axle. The various adjustment points on the device can be altered in order to ensure that the scale reading on the meter is at a predetermined point which can be marked on the scale or meter face as indicating the maximum legal load permitted for that axle. A fine adjustment can be via the potentiometer associated with that device or by a needle adjustment means externally located on the meter itself.

By selection of a transducer of a sensing device on a different axle via the multiposition selector switch, and having a measured load of the maximum permitted weight bearing on that axle, the meter reading can be adjusted by the potentiometer associated with that device to the pre-selected position as marked with the first device. Similar procedure is followed for any other axle. The potentiometers remain in their set positions so that any load placed on the truck registers, for each axle, a reading on the meter which the operator can note in comparison to the marked needle position which is the maximum legal load for each axle.

With vehicles such as trailers a portable console can be provided suitably calibrated for each trailer for attachment to the transducer means when the trailer is being loaded.

The circuit can also incorporate an audible warning device e.g. a buzzer which is preset to sound at any desired point e.g. when the load is nearly at the maximum legal load to warn an operator who may not have sight of the gauge.

Figure 4:
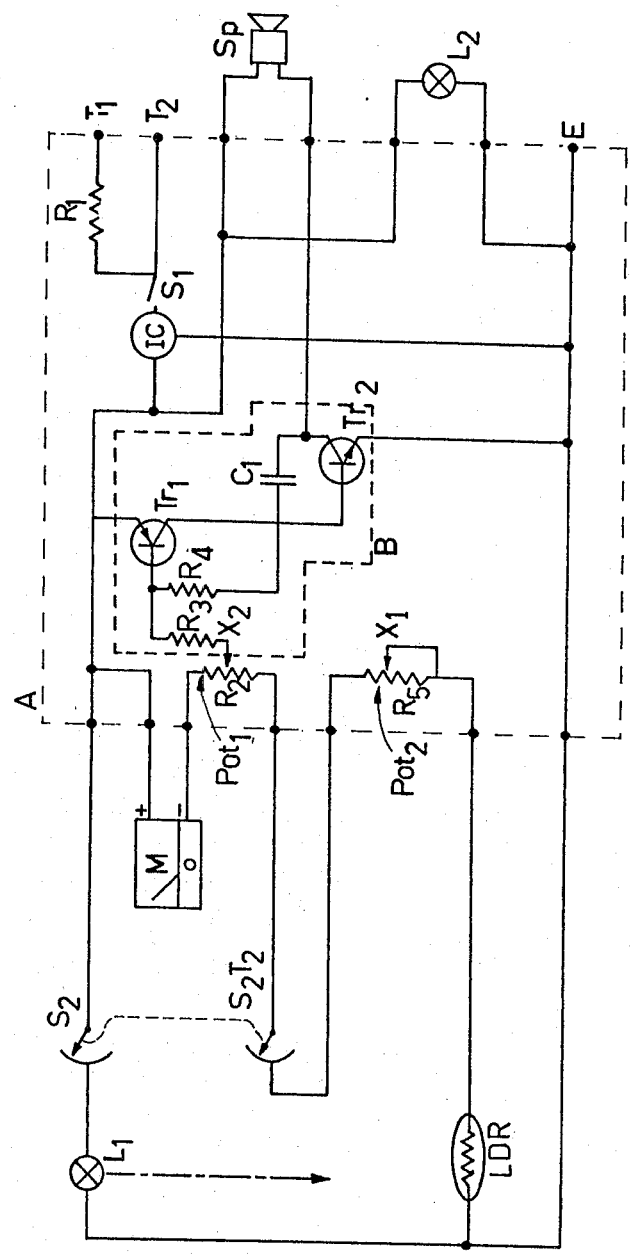

A suitable circuit for the operation of the invention is shown in FIG. 4 of the drawings. Two terminals $T_1$ and $T_2$ are provided — $T_1$ for connection to the positive terminal of a 24 volt battery (also incorporating a resistor $R_1$) and $T_2$ for connection to the positive terminal of a 12 volt battery depending on the voltage employed by the vehicle with the terminal E connecting to the negative terminal of such battery. Suitably E is an earth point in the console e.g. a heat sink. Main switch $S_1$ leads to an integrated circuit voltage regulator I.C. with the case thereof being earthed to the heat sink (not shown). The output from the voltage regulator I.C. is suitably 5.5 volts drives through multiposition switch $S_1$, the light bulb $L_1$ which beams onto the light dependent resistor LDR and which also receives the output from the voltage regulator I.C. The output from LDR passes through sensitivity potentiometer $Pot_2$ consisting of a resistor R.5 and adjustable take off, point X back through a second terminal S2T2 on multiposition switch $S_2$ to resistor $R_2$ and then to the meter M.

The Block B is an oscillator circuit which is considered self-explanatory in itself oscillating at a predetermined voltage as taken from Point $X_2$ on resistor $R_2$ in potentiometer $Pot_1$. When oscillating said circuit drives speaker Sp creating an audible sound.

In setting the meter, a maximum legal load is applied to an axle and the multiposition switch $S_2$ position selected for that axle. Light from $L_1$ will then fall in maximum quantity on LDR which increases the current therethrough and hence increases the voltage at point $X_2$ to a predetermined level at which the oscillator circuit oscillates. Meter M also registers the increased current, with a suitable marking being made on the scale where the maximum legal load is present.

The circuit involving the connection of the other transducer units has not been shown but each unit will have a light source $L_1$ a light dependent resistor LDR and a sensitivity potentiometer $Pot_2$ connected in the same way as shown and selected through switch $S_2$.

A further light $L_2$ located on the console of the vehicle can be incorporated to show when the circuit is live.

Block A can be arranged on a printed circuit board and suitable values for the components are as follows:

| | |
|---|---|
| $R_1$ | 22 Ω |
| $R_2$ | 2K |
| $R_3$ | 22K |
| $R_4$ | 270 Ω |
| $R_5$ | 10K |
| I.C. | National Semi conductor of Australia LM 308K voltage regulator |
| $L_1$ | 6v 0.3 A |
| LDR | Phillips LDR 03 |
| $Tr_1$ | BC 177 |
| $Tr_2$ | BC 108 |
| $C_1$ | 0.15 μF |
| Sp. | 8 Ω |
| $L_2$ | 6v 0.1 A |
| M | 1.0 mA. (full scale) |

All material parts of the device according to this invention will be constructed of non-corrosive material but particularly of strong material in order to provide an extended life for the parts.

So that in accordance with this invention there is provided an apparatus which satisfactorily provides an indication of the load on a vehicle.

I claim:

1. An apparatus for providing an indication of the weight of a load on a vehicle or on any part of the vehicle comprising a sensing means operable between a moving part and a stationary part of the vehicle and sensing the distance between the stationary part and the moving part, a transducer unit converting any alteration of the said distance detected by the sensing means into a proportional electric property and an electrical gauge receiving the output from said transducer unit characterised in that the transducer unit includes a spindle associated with a light beam, a shutter for the light beam and a photoelectric cell receiving the light beam, the arrangement being such that alteration of the said distance detected by the sensing means is followed by proportional rotation of the spindle which causes the light beam to be proportionately modified by the shutter in a manner which is detectable by the photoelectric cell and converted into a proportional electric property.

2. Apparatus as claimed in claim 1 wherein the potential across the photoelectric cell is controlled by a voltage control means.

3. An apparatus as claimed in claim 1 wherein on rotation of the spindle, the shutter moves across the light beam to proportionately alter the quantity of incident light falling on the active surface area of the photoelectric cell.

4. An apparatus as claimed in claim 3 wherein the shutter is rigidly mounted on the spindle.

5. An apparatus as claimed in claim 4 wherein the shutter is an eccentrically mounted circular plate.

6. An apparatus as claimed in claim 5 wherein the light beam is produced from a light source shining through a narrow rectangular aperture, and wherein the eccentrically mounted circular plate is located in front of the aperture such that on rotation of the spindle the plate exposes more light in the lightbeam to the photoelectric cell.

7. An apparatus as claimed in claim 1 wherein the sensing means includes a sensor arm having two rigid end portions joined by a spring in a turnbuckle effect, with the rigid end portions being adapted to be connected between the moving part and the stationary part of the vehicle in such a manner as to detect any change in the alteration of the aforesaid distance.

8. An apparatus as claimed in claim 7 wherein one of the rigid end portions of the sensor arm is connected through a toggle arm to a spindle in the transducer means, with the other rigid arm portion pivotably connected to one part of the vehicle being either the moving part or stationary part and the transducer means connected to the other part such that alteration of the distance between the stationary and moveable part of the vehicle is converted by the sensor arm through the toggle arm into rotational movement of the spindle.

9. An apparatus as claimed in claim 8 wherein the pivotal attachments are elbow joints.

10. An apparatus as claimed in claim 8 wherein one end of the toggle arm is pivotally attached to the rigid end portion of the sensor arm with the other end of the toggle arm being rigidly attached to the spindle rotateably mounted in the transducer means and where a buffering means is provided to prevent the toggle arm rotating more than a desired angle.

11. An apparatus as claimed in claim 9 wherein the spring joining the rigid end portions is an expansion spring.

12. An apparatus as claimed in claim 11 wherein the rigid end portion attached to the toggle arm is curved in a rigid manner towards the spindle such that the direction of the force on the sensor arm when the toggle arm strikes the buffering means assists the spring joining the rigid end portions to buckle in a resilient manner.

* * * * *